US008645690B2

(12) United States Patent
Lee et al.

(10) Patent No.: US 8,645,690 B2
(45) Date of Patent: Feb. 4, 2014

(54) METHOD OF VERIFYING KEY VALIDITY AND SERVER FOR PERFORMING THE SAME

(75) Inventors: Sok-Joon Lee, Daejeon (KR); Jung-Yeon Hwang, Suwon (KR); Gun-Tae Bae, Daejeon (KR); Byung-Ho Chung, Daejeon (KR); Sin-Hyo Kim, Daejeon (KR); Hye-Ran Mun, Gwangju (KR); Sang-Woo Lee, Daejeon (KR); Yun-Kyung Lee, Daejeon (KR); Hyun-Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 68 days.

(21) Appl. No.: 13/327,099

(22) Filed: Dec. 15, 2011

(65) Prior Publication Data

US 2012/0159166 A1    Jun. 21, 2012

(30) Foreign Application Priority Data

Dec. 20, 2010 (KR) .......................... 10-2010-0131001

(51) Int. Cl.
*H04L 9/00* (2006.01)
(52) U.S. Cl.
USPC .......................................... 713/168; 713/158
(58) Field of Classification Search
None
See application file for complete search history.

(56) References Cited

U.S. PATENT DOCUMENTS

| 2007/0180497 | A1* | 8/2007 | Popescu et al. ................... 726/4 |
| 2010/0122081 | A1* | 5/2010 | Sato et al. ....................... 713/158 |
| 2011/0154045 | A1  | 6/2011 | Lee et al. |

FOREIGN PATENT DOCUMENTS

KR    1020110070765 A    6/2011

OTHER PUBLICATIONS

Dan Boneh et al., "Short Group Signatures", CRYPTO, 2004, pp. 41-55, International Association fo Cryptologic Research.
Dan Boneh et al., "Group Signatures wiith Verifier-Local Revocation", ACM CCS, 2004, pp. 1-21.

* cited by examiner

*Primary Examiner* — Brandon Hoffman
*Assistant Examiner* — Nega Woldemariam

(57) ABSTRACT

Disclosed herein is a method of verifying key validity and a server for performing the method. The method is configured such that a service provision server verifies key validity in an anonymous service for providing local linkability. The service provision server receives a revocation list. A local revocation list is generated using the received revocation list and a secret key. A virtual index of a service user required to verify key validity is calculated. Whether a key of the service user is valid is verified, based on whether the virtual index is included in the local revocation list.

7 Claims, 10 Drawing Sheets

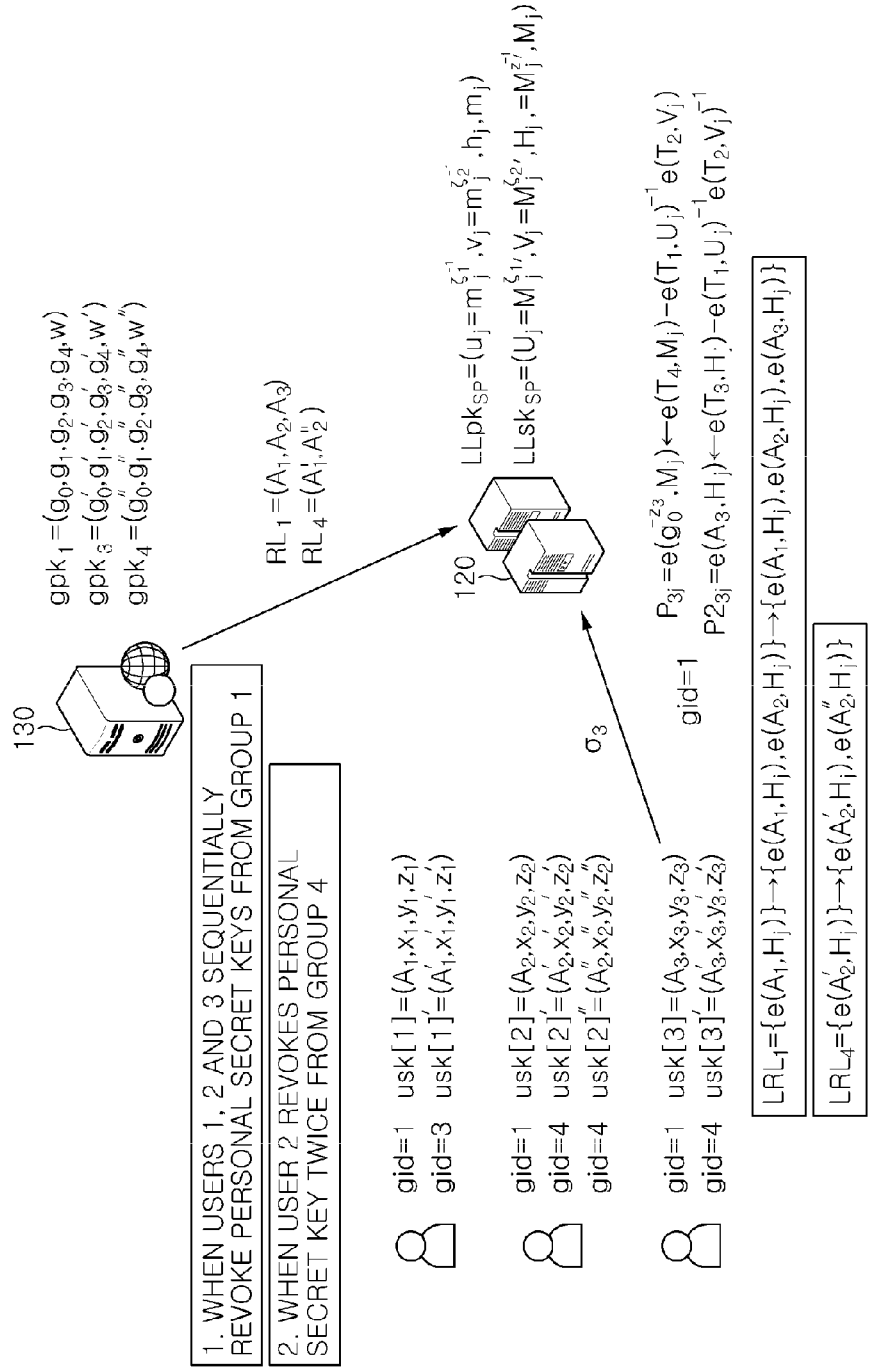

METHOD OF VERIFYING KEY VALIDITY AND SERVER FOR PERFORMING THE SAME

CROSS REFERENCE TO RELATED APPLICATION

This application claims the benefit of Korean Patent Application No. 10-2010-0131001, filed on Dec. 20, 2010, which is hereby incorporated by reference in its entirety into this application.

BACKGROUND OF THE INVENTION

1. Technical Field

The present invention relates generally to a method of verifying key validity and a server for performing the method. More particularly, the present invention relates to a method of verifying the validity of keys in anonymous authentication that provides local linkability and to a server for performing the method.

2. Description of the Related Art

Recently, as the privacy of each individual person has become important, schemes for authenticating a user based on anonymity instead of authentication based on the real name of the user have been developed. That is, most services do not need to check the real name of a specific person, and for these services, simply checking whether the user has authority to access a relevant service (for example, whether the user is an adult) may be sufficient in many cases.

A representative method of checking whether the user has authority to access a service is the short group signature scheme that was investigated and published by D. Boneh et al.

Such a short group signature scheme includes basic functions for conditionally traceable anonymity such as anonymity, traceability, and unlinkability.

However, when unlinkability is applied to typical Internet services, a great increase in inconvenience may result. When a user is provided with the same service while being continuously authenticated, a service provider cannot recognize whether the user is the same service user, and thus it is impossible to provide a member management service and various types of services based on such member management (for example, a mileage service).

Since linkability enables the course of a person to be traced, its introduction is characterized by being undesirable from the viewpoint of privacy.

A conventional anonymous authentication method is configured to provide linkability only in a specific service domain, and provide local linkability between different service domains so that linking is not supported in relation to whether users are the same service user, thus making it impossible to trace the course of each service user while enabling members to be managed anonymously.

In such an anonymous authentication method, it can be determined whether a service user possesses a correct key by verifying a signature that is furnished by the service user, but it is very inefficient to determine whether the key has been revoked or the key is no longer valid.

A Public Key Infrastructure (PKI) based on X.509 provides a Certificate Revocation List (CRL), an Online Certificate Status Protocol (OCSP), etc. In the PKI, since each certificate includes a unique number, the unique number is compared to the certificate revocation list, thus enabling the validity of a key to be easily verified.

However, those anonymous authentication methods issue unique keys to respective service users, but those keys are not directly exposed when a signature is created and when verification is performed, so that it is impossible to compare key values. As a result, other inefficient schemes must be inevitably used.

Methods of verifying key validity in anonymous authentication methods are classified into an online key update method and a Verifier Local Revocation (VLR) method.

Such an online key update method is a method of updating public keys and the secret keys (or private keys) of all service users using revoked keys. The online key update method prohibits the user of a revoked key from updating a secret key, thus naturally preventing the user of the revoked key from creating his or her signature.

Such a VLR method is a method in which a signature verifier or a service provider directly performs verification, and which determines whether a key has been revoked upon verifying a signature using a published revocation list.

All of the above anonymous authentication methods have the following problems related to inefficiency.

The online key update method is problematic in that when the length of a revocation list increases, it may take a long time for a service user to update his or her secret key before creating a signature.

For example, such an online key update method is disadvantageous in that unless a service user always makes online access, if the service user makes online access after a long period of time has passed by in the case where the service user irregularly makes online access and updates a secret key, the update of the secret key must be performed using a significantly long revocation list. This may not fulfill the requirements of a service user who desires to be anonymously authenticated immediately or within several seconds.

Such a VLR method is characterized in that since a service provider always makes online access, a revocation list can be continuously received, but is problematic in that the time required to verify a signature is lengthened in proportion to the length of the revocation list.

That is, when a signature is verified, computations corresponding to the computation level of a public key are required in an algorithm for verifying validity. In this case, there is a problem in that when the length of a revocation list increases, the time required by the service provider is proportional to the length of the revocation list, and thus long computations must be performed whenever a signature is verified.

SUMMARY OF THE INVENTION

Accordingly, the present invention has been made keeping in mind the above problems occurring in the prior art, and an object of the present invention is to provide a method of verifying key validity in anonymous authentication that provides local linkability, and a server for performing the method.

In accordance with an aspect of the present invention to accomplish the above object, there is provided a method of verifying key validity, the method being configured such that a service provision server verifies key validity in an anonymous service for providing local linkability, including receiving a revocation list at the service provision server; generating a local revocation list using the received revocation list and a secret key; calculating a virtual index(=local anonymous identifier) of a service user required to verify validity of a key of the service user; and verifying whether a key of the service user is valid, based on whether the virtual index is included in the local revocation list.

Preferably, the receiving the revocation list may be configured such that the service provision server receives the revocation list that corresponds to a set of keys of users, generated when an anonymous authentication server revokes anonymous secret keys, and that has been published by the anonymous authentication server.

Preferably, the verifying whether the key of the service user is valid may include determining that authentication has been requested using a valid key that has not been revoked if the virtual index is not included in the local revocation list.

Preferably, the verifying whether the key of the service user is valid may include determining that authentication has been requested using an invalid key that has been revoked if the virtual index is included in the local revocation list.

In accordance with another aspect of the present invention to accomplish the above object, there is provided a service provision server for verifying key validity in an anonymous service for providing local linkability, including a list generation module for generating a local revocation list using a revocation list and a secret key; an index generation module for, generating a virtual index of a service user; and a verification module for verifying whether a key of the service user is valid, based on whether the virtual index is included in the local revocation list.

Preferably, the revocation list may be a list that corresponds to a set of keys of users, generated when an anonymous authentication server revokes anonymous secret keys, and that has been published by the anonymous authentication server.

Preferably, the verification module may be configured either to determine that authentication has been requested using a valid key that has not been revoked if the virtual index is not included in the local revocation list or to determine that authentication has been requested using an invalid key that has been revoked if the virtual index is included in the local revocation list.

BRIEF DESCRIPTION OF THE DRAWINGS

The above and other objects, features and advantages of the present invention will be more clearly understood from the following detailed description taken in conjunction with the accompanying drawings, in which:

FIG. 10 is a diagram illustrating an example of the verification of key validity according to an embodiment of the present invention.

DESCRIPTION OF THE PREFERRED EMBODIMENTS

Figure 1:
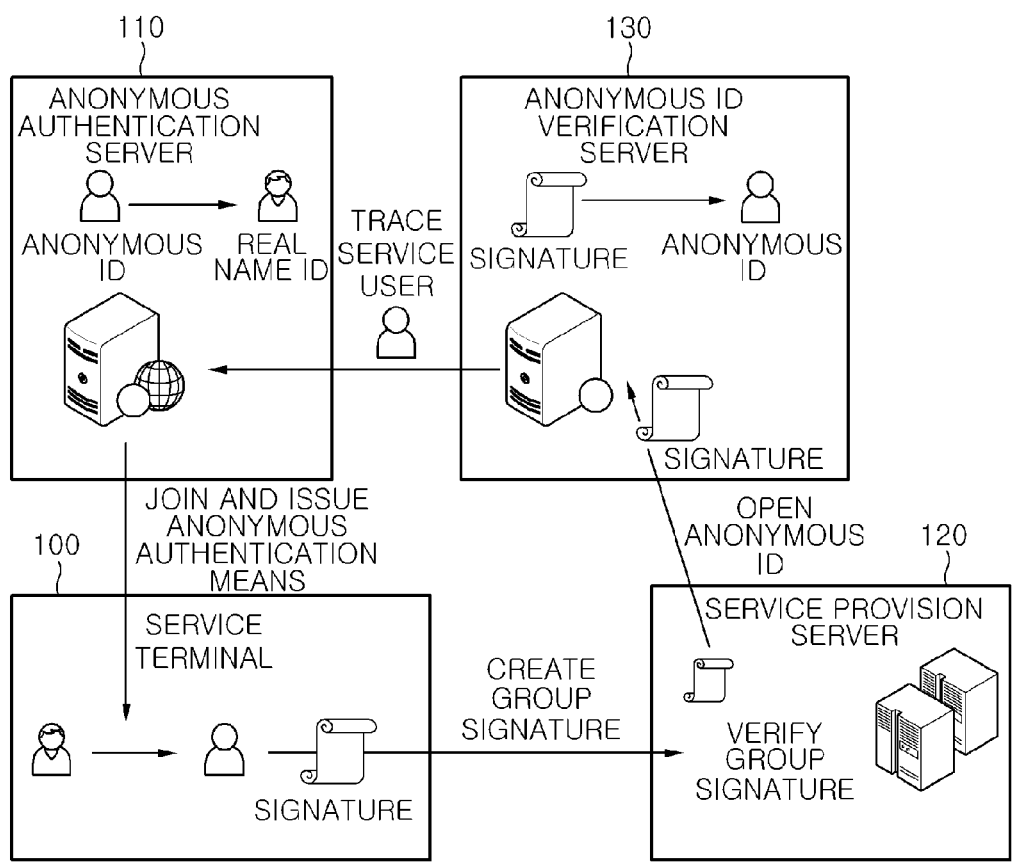
FIG. 1 is a diagram showing an anonymous service system using a typical short group signature.

Reference now should be made to the drawings, in which the same reference numerals are used throughout the different drawings to designate the same or similar components.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, a method of verifying key validity and a server for performing the method according to embodiments of the present invention will be described in detail with reference to the attached drawings.

Prior to describing the method of verifying key validity according to the present invention, a short group signature scheme which is the basis of the present invention will be primarily described.

A group signature scheme was initially proposed by D. Chaum et al. in EUROCRYPT conference in 1991, and is configured such that any member belonging to a group can create a signature and a verifier can verify whether the signature is correct or incorrect, but cannot know any information about a signer. A group manager is the most important entity in the group signature scheme, and is capable of finding out the identity of a group signer by tracing the group signature.

A short group signature scheme is a kind of group signature scheme proposed by D. Boneh et al. in the CRYPTO conference in 2004, and is advantageous in that the length of a signature is fixed and is short (1533 bits) and the time required for a signature and verification is relatively short.

FIG. 1 is a diagram showing an anonymous service system using a typical short group signature.

Referring to FIG. 1, the anonymous service system may include a service terminal 100, an anonymous authentication server 110, a service provision server 120, and an anonymous identification (ID) verification server 130.

The service terminal 100 is a device configured to allow a user to be issued with an anonymous authentication means (anonymous ID∥secret key) from the anonymous authentication server 110 and to anonymously use the service. Since the service terminal 100 according to the embodiment of the present invention is driven and used by the service user, the service terminal will be collectively called the service user for the sake of description.

The anonymous authentication server 110 verifies the real name of the service user and issues an anonymous authentication means to the service user. If there is a problem, the anonymous authentication server 110 can trace the real name of the user in conjunction with the anonymous ID verification server 130, but it cannot independently perform tracing.

The service provision server 120 anonymously provides the service, and can request the anonymous ID verification server 130 to trace the real name of an anonymous user if there is a problem.

The anonymous ID verification server 130 can receive an anonymous authentication transaction from the service provision server 120 and verify the anonymous ID from the anonymous authentication transaction.

An existing group signature such as a short group signature has the characteristics of making it difficult to provide unlinkability. That is, for two signatures, none but the anonymous ID verification server can determine whether those signatures have been generated by the same service user. These characteristics have the disadvantage of making it difficult to introduce the anonymous authentication scheme to a member-based service.

For linkability, a fictitious name-based scheme can be utilized, but this scheme enables the course of a specific service user to be traced because all of authentication means generated from one fictitious name are linked. In addition, since such a fictitious name-based scheme also enables the real name of the user to be derived using a social method, it is not regarded as a good scheme.

In order to supplement for these insufficiencies, an anonymous authentication scheme for providing local linkability has recently been introduced. The term 'local linkability' denotes the state in which it is possible to determine whether individual anonymous authentication transactions are those of the same user in a specific service domain, so that members can be managed in that domain, whereas it is impossible to determine whether anonymous authentication transactions between different service domains are those of the same user.

Figure 2:
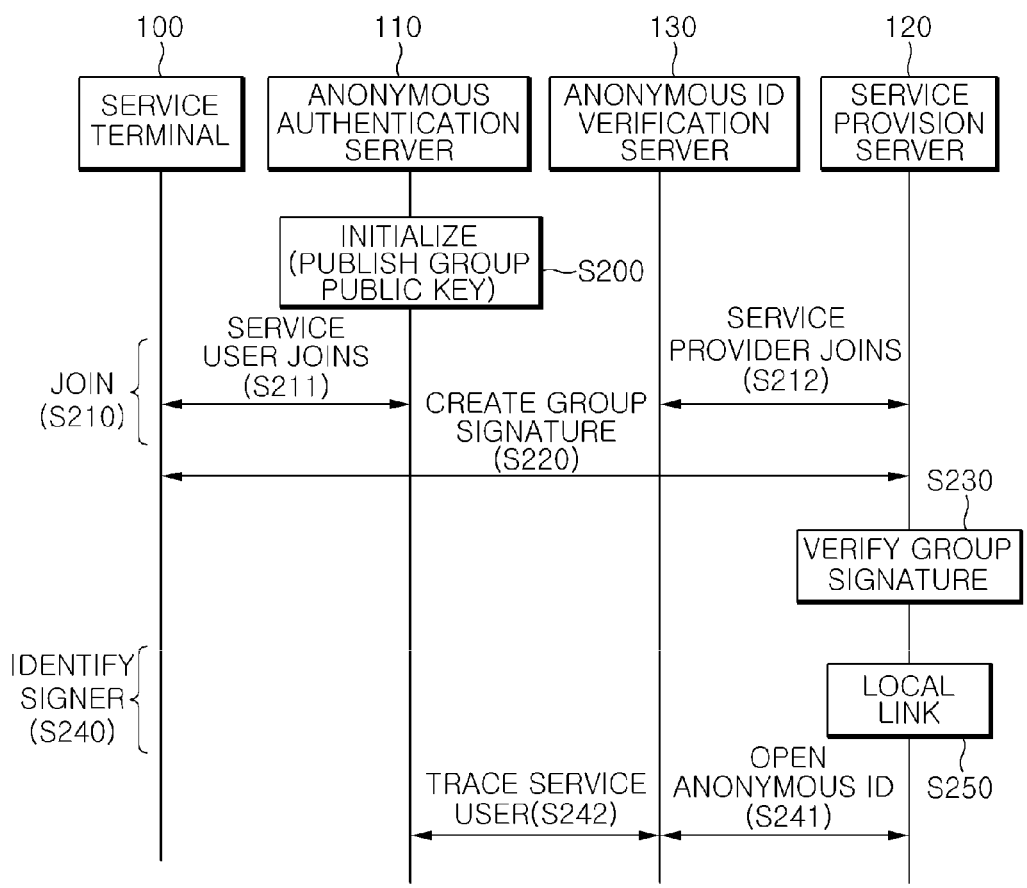
FIG. 2 is a diagram showing an anonymous service method for providing local linkability.

FIG. 2 is a flowchart showing an anonymous authentication method of providing local linkability.

As shown in FIG. 2, the anonymous authentication method includes an initialization (setup) procedure (step S200), a join procedure (step S210), a group signature creation (sign) procedure (step S220), a group signature verification procedure (step S230), a signer identification (open) procedure (step S240) and a local link procedure (step S250).

The individual procedures of the method will be described in detail below.

Figure 3:
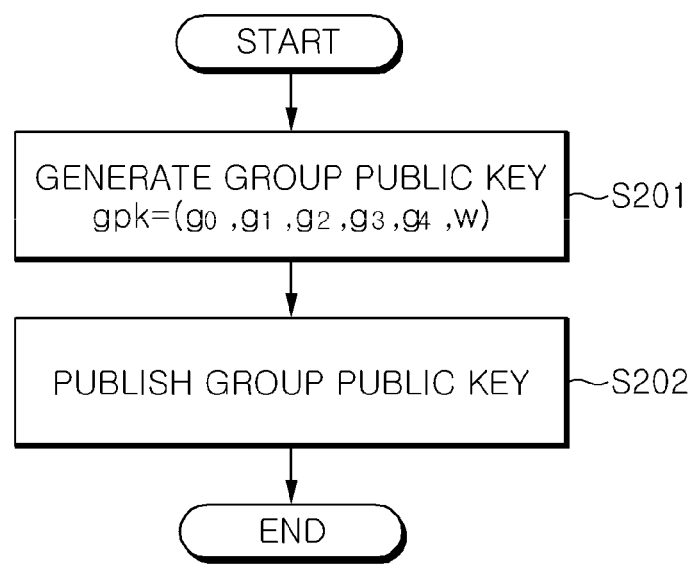
FIG. 3 is a flowchart showing the initialization procedure of FIG. 2 in detail.

First, in the setup procedure (S200), the anonymous authentication server 110 performs the following procedure, as shown in FIG. 3.

At step S201, the anonymous authentication server 110 receives a security parameter K as input and performs a subsequent procedure. First, the anonymous authentication server 110 generates a computable isomorphic function $\phi$ combined with a bilinear group pair "($G_1$, $G_2$)", a bilinear function (e: $G_1 \times G_2 \rightarrow G_T$), and a hash function (H: $\{0, 1\}^* \rightarrow Z_p$) using group public parameters (e, $G_1$, and $G_2$). Further, any generation sources ($g_2 \in G_2 \backslash \{1_{G_2}\}$ and $g_0$, $g_3$, $g_4$, $h \in \backslash \{1_{G_1}\}$) are selected, $g_1 = \phi(g_2)$ is calculated, a master secret key (or private key) ($\gamma \in Z^*_p$) is selected, and a group public key element ($w = g_2^\gamma \in G_2$) is calculated, so that an initial group public key (gpk=($g_0$, $g_1$, $g_2$, $g_3$, $g_4$, w)) is obtained.

At step S202, the anonymous authentication server 110 publishes the group public key to all participants. In this case, the group public key is updated whenever a revocation event occurs. Further, "$\eta_1 \leftarrow e(g_1, g_2)$, $\eta_4 \leftarrow e(g_3, g_2)$, and $\eta_5 \leftarrow e(g_4, g_2)$" required to reduce the computation of a pairing function of the group public key can be selectively included in the public key.

Thereafter, in the join procedure at step S210, a service user join step S211 and a service provider join step S212 are performed, as shown in FIG. 2. In this case, the service user join step S211 is a procedure for the service user 100 who desires to join the group and use a group signature key, and the service provider join step S212 is a procedure for the service provision server for ensuring local linkability.

The service provider join step is generally performed before the anonymous service is provided, and if possible, a service provider must avoid being reissued with a key after having been initially issued with a key so as to maintain the continuity of the service. The service user can undergo the service user join step anytime, and it must be possible for a single service user to be issued with a group signature secret key several times while undergoing the service user join step.

Figure 4:
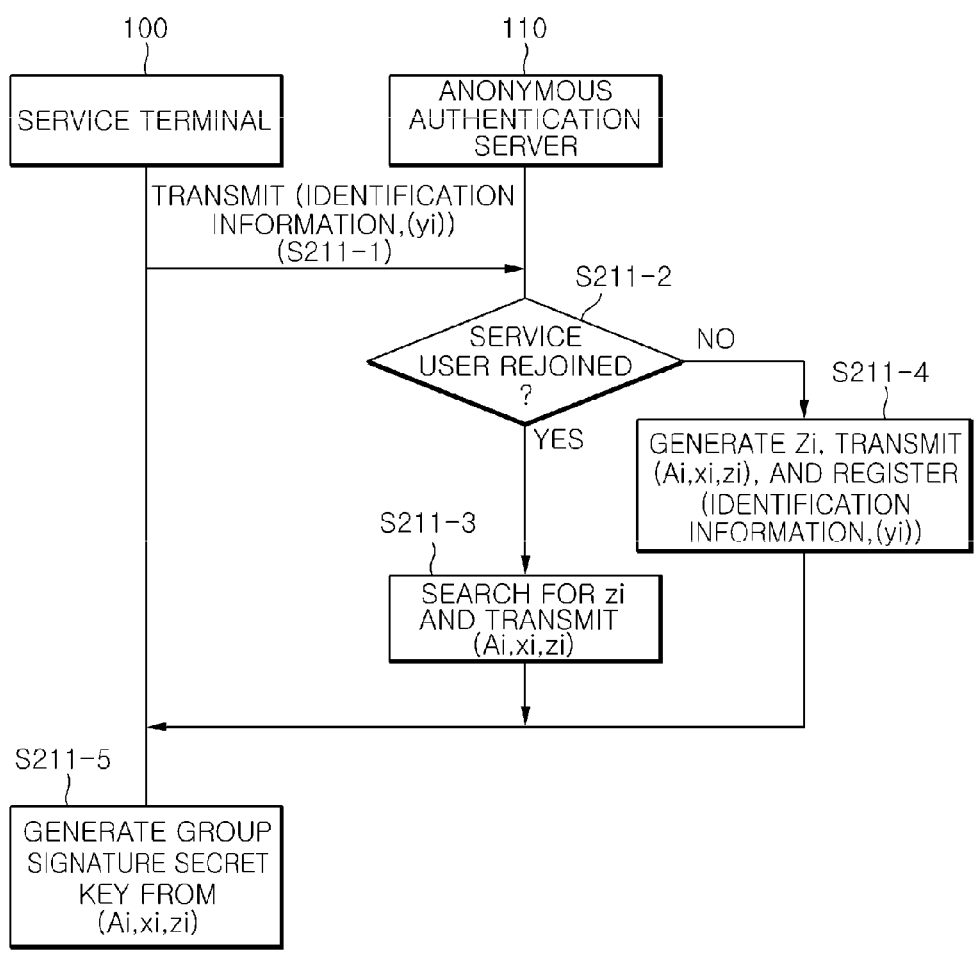
FIG. 4 is a flowchart showing the service user join step of FIG. 3 in detail.

As shown in FIG. 4, it is assumed that the service user join step S211 is performed by both the service user 100 and the anonymous authentication server 110, and, in this regard, a security channel is established between the service user 100 and the anonymous authentication server 110.

At step S211-1, the service user 100 selects its own secret key ($y_i \in Z^*_p$) and calculates a public key ($g_3 \in G_1$). Further, A proof of possession (POP) of the secret key ($y_i$), that is, information (POP($y_i$)) proving that the secret key ($y_i$) has been possessed, is generated using the public key ($g_3$). Thereafter, the service user 100 transmits "identification information and POP($y_i$)" to the anonymous authentication server 110. This information (POP($y_i$)) must include $g_3^{-y_i}$ or information used to directly calculate this value.

At step S211-2, the anonymous authentication server 110 receives "identification information and POP($y_i$)" transmitted from the service user 100 who desires to join, verifies the validity of the received information, and then determines whether the service user 100 has rejoined using the following procedure. First, a list of service users has a format such as "(identification information, POP($y_i$), $z_i$ and $g_0^{-z_i}$)", where $z_i$ and $g_0^{-z_i}$ always have fixed values for a single service user.

At step S211-3, if the service user 100 has already joined and relevant identification information is present in a list of users (User-List), the anonymous authentication server 110 obtains $z_i$ registered with respect to the relevant user in the user list, selects any random number $x_i \in Z^*_p$, and calculates an anonymous ID, that is, $A_i = (g_1 g_4^{-z_i} g_3^{-y_i})^{1/(\gamma+x_i)} \in G_1$. Further, the anonymous authentication server 110 transmits ($A_i$, $x_i$, $z_i$), which is generated as the group member key of the service user 100, to the relevant service user 100.

At step S211-4, if the service user 100 initially joins and so the "(identification information and POP($y_i$))" of the user are not registered in the user list, the anonymous authentication server 110 selects any random numbers $x_i$, $z_i \in Z^*_p$, and calculates an anonymous ID $A_i = (g_1 g_4 g_3^{-y_i})^{1/(\gamma+x_i)} \in G_1$. Further, the anonymous authentication server 110 registers the relevant service user 100 by adding the "(identification information, POP($y_i$), $z_i$, $g_0^{-z_i}$)" to the user list while transmitting the group member key ($A_i$, $x_i$, $z_i$) of the service user 100 to the service user 100 (wherein $g_0^{-z_i}$ corresponds to an anonymous ID fixed to the specific user, and will simply be abbreviated as '$B_i$' hereinafter).

Figure 5:
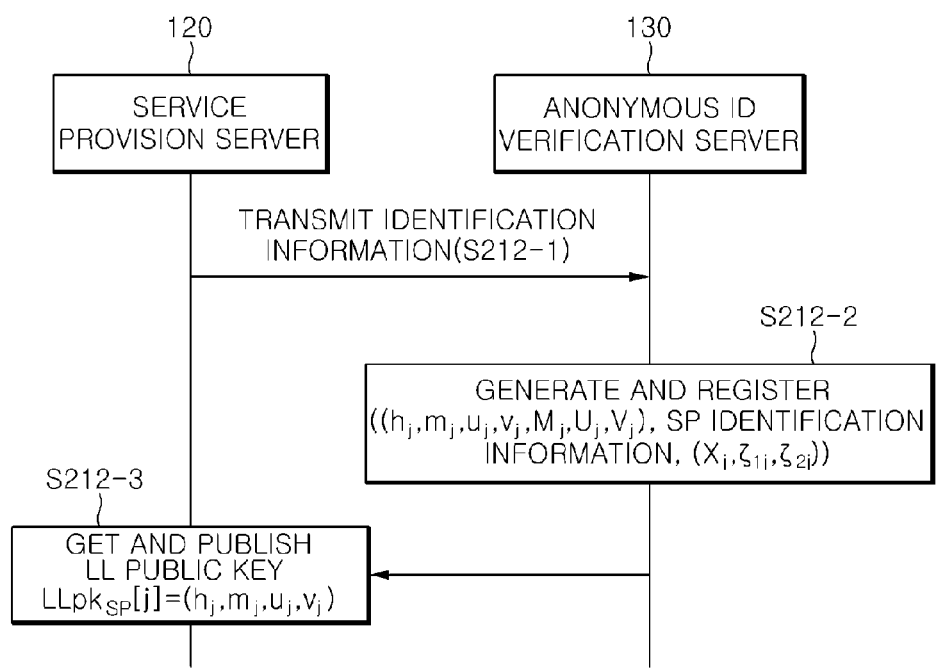
FIG. 5 is a flowchart showing the service provider join step of FIG. 4 in detail.

At step S211-5, the service user 100 receives the group member key ($A_i$, $x_i$, $z_i$), and thereafter determines whether the following Equation 1 is valid. If it is determined that the following Equation 1 is valid, the service user 100 stores gsk[i]=($A_i$, $x_i$, $z_i$, $y_i$) as his or her own group signature secret key.

$$e(A_i, w \cdot g_2^{x_i}) = e(g_1 g_4^{-z_i} g_3^{-y_i}, g_2)(= \eta_1 \cdot \eta_5^{-z_i} \cdot \eta_4^{-y_i}) \quad (1)$$

e( ): cryptographic bilinear pairing map $A_i$, $x_i$, $z_i$, $y_i$ group member key $g_1$, $g_2$, $g_3$, $g_4$, w: group public key As shown in FIG. 5, the service provider join step S212 is performed by both the service provision server 120 and the anonymous ID verification server 130. Here, it is assumed that a security channel is established between the service provision server 120 and the anonymous ID verification server 130.

At step S212-1, the service provision server 120 transmits its own SP identification information to the anonymous ID verification server 130.

At step S212-2, the anonymous ID verification server 130 receives the SP identification information from the service provision server 120, verifies the validity of the SP identification information, selects any generation sources "$m_j \in G_1 \backslash \{1_{G_1}\}$ and $m_j \in G_2 \backslash \{1_{G_2}\}$" and random numbers "$\chi_j$, $\xi_{1j}$, $\xi_{2j} \in Z^*_p$", and calculates $h_j = m_j^{\chi_j}$, $u_j = m_j^{\xi_{1j}^{-1}}$, $v_j = m_j^{\xi_{2j}^{-1}} \in G_1$, $U_j = M_j^{\xi_{1j}}$ and $V_j = M_j^{\xi_{2j}} \in G_2$. Further, after calculating a pair of public keys and secret keys for a local link ($h_j, m_j, u_j, v_j, M_j, U_j, V_j$) and a trace key($tk_{SP}[j] = (\chi_j, \xi_{1j}, \xi_{2j})$), the anonymous ID verification server 130 transmits the pair of public keys and secret keys ($h_j, m_j, u_j, v_j, M_j, U_j, V_j$) to the service provision server 120.

The Local Link (LL) public key of the service provision server 120 can be represented by "$LLpk_{SP}[j] = (h_j, m_j, u_j, v_j)$ (where $h_j = m_j^{\chi_j}$, $u_j = m_j^{\xi_{1j}^{-1}}$, $v_j = m_j^{\xi_{2j}^{-1}} \in G_1$, $m_j \in G_1 \backslash \{1_{G_1}\}$, and $\chi_j$, $\xi_{1j}, \xi_{2j} \in Z^*_p$)", the LL secret key can be presented by "$LLsk_{SP}[j] = (M_j, U_j, V_j)$ (where $M_j \in G_2 \backslash \{1_{G_1}\}$, $U_j = M_j^{\xi_{1j}}$, $V_j = M_j^{\xi_{2j}} \in G_2$)", and the trace key can be represented by "$tk_{SP}[j] = (\xi_{1j}, \xi_{2j}, \chi_j)$ (where $\chi_j, \xi_{1j}, \xi_{2j} \in Z^*_p$)".

At step S212-2, the anonymous ID verification server 130 registers the service provision server 120 by adding (($h_j, m_j, u_j, v_j, M_j, U_j, V_j$), SP identification information, and ($\chi_j, \xi_{1j}, \xi_{2j}$)) to a service provision server list (SP-List).

At step S212-3, the service provision server 120 receives the pair of public keys and secret keys ($h_j, m_j, u_j, v_j, M_j, U_j, V_j$), and then determines whether the following Equation 2 is valid. If it is determined that the following Equation 2 is valid, the service provision server 120 stores "$LLsk_{SP}[j] = (M_j, U_j, V_j)$" as its own LL secret key, and generates and publishes the LL public key ($LLpk_{SP}[j] = (h_j, m_j, u_j, v_j)$).

$$e(m_j, M_j) = e(u_j, U_j) = e(v_j, V_j) \quad (2)$$

$e(\ )$: cryptographic bilinear pairing map
$m_j, u_j, v_j$: LL Public Key
$M_j, U_j, V_j$: LL Secret Key
j: service provider In this case, it is assumed that the service user 100 can verify that the values included in the LL public key are values issued by the anonymous ID verification server 130 for the service provision server 120. For this operation, a certificate for the LL public key may also be used.

Figure 6:
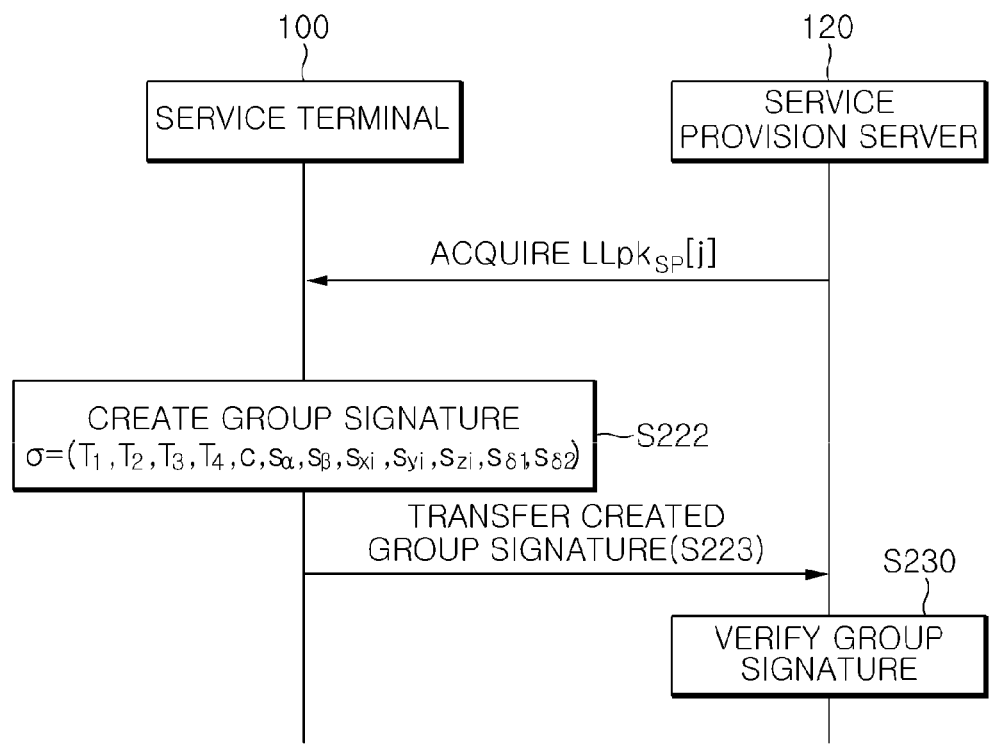
FIG. 6 is a flowchart showing the group signature creation procedure of FIG. 4 in detail.
Figure 7:
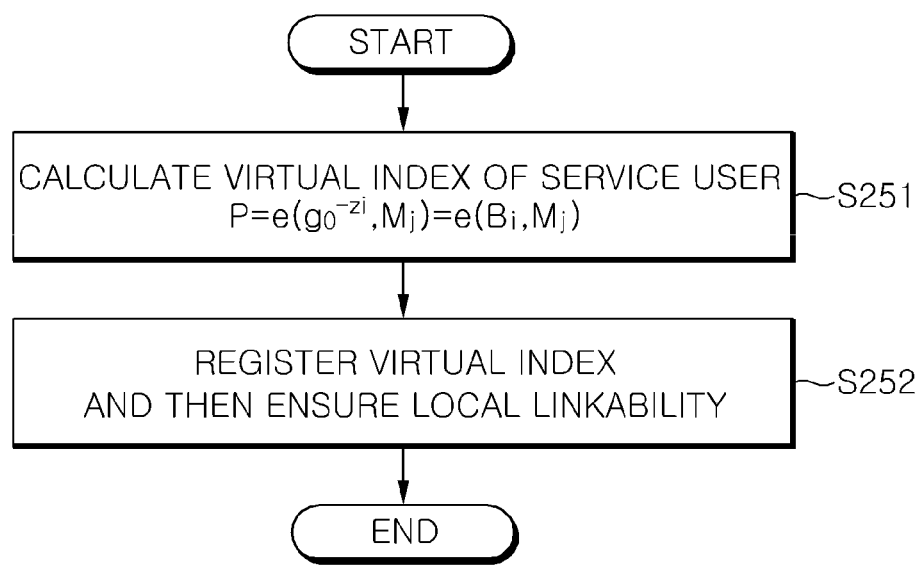
FIG. 7 is a flowchart showing the local link procedure of FIG. 4 in detail.

In the group signature creation (sign) procedure at step S220, the service user 100 creates a group signature in cooperation with the service provision server 120, as shown in FIG. 6.

At step S221, the service user 100 acquires an LL public key ($LLpk_{SP}[j]$) from the service provision server 120.

At step S222, the service user 100 creates a group signature using the group public key (gpk), the LL public key ($LLpk_{SP}[j]$), a secret key ($gsk[i] = (A_i, x_i, z_i, y_i)$), and a message M.

That is, after any random numbers ($\alpha, \beta \in Z_p$) have been selected, "$T_1 = u_j^\alpha$, $T_2 = v_j^\beta$, $T_3 = A_i h_j^{\alpha+\beta}$ and $T_4 = g_0^{-z_i} m_j^{\alpha-\beta}$" are calculated, and "$\delta_1 = x_i \alpha$ and $\delta_2 = x_i \beta$" are then calculated. Furthermore, any random numbers ($r_\alpha, r_\beta, r_{x_i}, r_{y_i}, r_{z_i}, r_{\delta_1}, r_{\delta_2} \in Z_p$) are selected, and "$R_1, R_2, R_3, R_4, R_5, R_6$" are calculated by the following procedure. After the hash value ($c = H(M, T_1, T_2, T_3, T_4, R_1, R_2, R_3, R_4, R_5, R_6)$) has been calculated using the calculated values and the message M, "$s_\alpha = r_\alpha + c\alpha$, $s_\beta = r_\beta + c\beta$, $s_{x_i} = r_{x_i} + cx_i$, $s_{z_i} = r_{z_i} + cz_i$, $s_{y_i} = r_{y_i} + cy_i$, $s_{\delta_1} = r_{\delta_1} + c\delta_1$ and $s_{\delta_2} = r_{\delta_2} + c\delta_2$" are calculated, so that a group signature ($\sigma = (T_1, T_2, T_3, T_4, c, s_\alpha, s_\beta, s_{x_i}, s_{y_i}, s_{z_i} s_{\delta_1}, s_{\delta_2})$) is created.

$$R_1 \leftarrow u_j^{r_\alpha}, R_2 \leftarrow v_j^{r_\beta} \quad (3)$$

$$R_3 \leftarrow e(T_3, g_2)^{r_{x_i}} \cdot e(h_j, w)^{-r_\alpha - r_\beta} \cdot e(h_j, g_2)^{-r_{\delta_1} - r_{\delta_2}} \cdot e(g_3, g_2)^{r_{y_i}} \cdot e(g_4, g_2)^{r_{z_i}},$$

$$R_4 \leftarrow g_0^{r_{z_i}} \cdot m_j^{-r_\alpha + r_\beta}, R_5 \leftarrow T_1^{r_{x_i}} u_j^{-r_{\delta_1}}, R_6 \leftarrow T_2^{r_{x_i}} v_j^{-r_{\delta_2}}$$

j: service provider
$g_0, g_1, g_2, g_3, g_4, w$: group public key
$R_1, R_2, R_3, R_4, R_5, R_6, r_\alpha, r_\beta, r_{x_i}, r_{y_i}, r_{z_i}, r_{\delta_1}, r_{\delta_2} \in Z_p$: temporary variable At step S223, the service user 100 transfers the group signature created at step S222 to the service provision server 120.

In the group signature verification procedure at step S230, the service provision server 120 or any participant performs the following procedure with respect to the group public key (gpk), the LL public key ($LLpk_{SP}[j]$), the message M, and the group signature ($\tilde{\sigma} = (\tilde{T}_1, \tilde{T}_2, \tilde{T}_3, \tilde{T}_4, \tilde{c}, \tilde{s}_\alpha, \tilde{s}_\beta, \tilde{s}_{x_i}, \tilde{s}_{y_i}, \tilde{s}_{z_i} \tilde{s}_{\delta_1}, \tilde{s}_{\delta_2})$).

The service provision server 120 or any participant calculates $\tilde{R}_1, \tilde{R}_2, \tilde{R}_3, \tilde{R}_4, \tilde{R}_5, \tilde{R}_6$ using the following Equation 4, and generates the hash value ($c = H(M, T_1, T_2, T_3, T_4, R_1, R_2, R_3, R_4, R_5, R_6)$) using the calculated values $\tilde{R}_1, \tilde{R}_2, \tilde{R}_3, \tilde{R}_4, \tilde{R}_5, \tilde{R}_6$, the values $\tilde{T}_1, \tilde{T}_2, \tilde{T}_3, \tilde{T}_4$ included in the group signature, and the message M, and determines whether the hash value is identical to $\tilde{c}$ contained in the group signature. If it is determined that the two values are identical, '1' (indicative of a valid group signature) is output, otherwise '0' (indicative of an invalid group signature) is output.

$$\tilde{R}_1 \leftarrow u_j^{\tilde{s}_\alpha} \cdot \tilde{T}_1^{-\tilde{c}}, \tilde{R}_2 \leftarrow v_j^{\tilde{s}_\beta} \cdot \tilde{T}_2^{-\tilde{c}} \quad (4)$$

$$\tilde{R}_3 \leftarrow e(\tilde{T}_3, g_2)^{\tilde{s}_x} \cdot e(h_j, w)^{-\tilde{s}_\alpha - \tilde{s}_\beta} \cdot$$

$$e(h_j, g_2)^{-\tilde{s}_{\delta_1} - \tilde{s}_{\delta_2}} \cdot e(g_3, g_2)^{\tilde{s}_{y_i}} \cdot e(g_4, g_2)^{\tilde{s}_{x_i}} \cdot \left( \frac{e(\tilde{T}_3, w)}{e(g_1, g_2)} \right)^{\tilde{c}}$$

$$\tilde{R}_4 \leftarrow \tilde{T}_4^{\tilde{c}} \cdot m_j^{-\tilde{s}_\alpha + \tilde{s}_\beta} g_0^{\tilde{s}_{x_i}},$$

$$\tilde{R}_5 \leftarrow \tilde{T}_1^{\tilde{s}_x} \cdot u_j^{-\tilde{s}_{\delta_1}}, \tilde{R}_6 \leftarrow \tilde{T}_2^{\tilde{s}_x} \cdot v_j^{-\tilde{s}_{\delta_2}}$$

$e(\ )$: cryptographic bilinear pairing map

In the signer identification (open) procedure at step S240, the anonymous ID verification server 130 and the anonymous authentication server 110 perform the following procedure.

The anonymous ID verification server 130 performs the following operation with respect to parameters provided by the service provision server 120 or any participant, that is, the group public key (gpk), the LL public key ($LLpk_{SP}[j]$), the trace key($tk_{SP}[j] = (\xi_{1j}, \xi_{2j}, \chi_j)$) corresponding to the LL public key, the message M, and the group signature ($\tilde{\sigma} = (\tilde{T}_1, \tilde{T}_2, \tilde{T}_3, \tilde{T}_4, \tilde{c}, \tilde{s}_\alpha, \tilde{s}_\beta, \tilde{s}_{x_i}, \tilde{s}_{y_i}, \tilde{s}_{z_i} \tilde{s}_{\delta_1}, \tilde{s}_{\delta_2})$) corresponding to the message M.

First, after the propriety of the group signature has been verified, an anonymous ID ($B_i = g_0^{-z_i} = \tilde{T}_4 \cdot (\tilde{T}_1^{-\xi_{1j}} \tilde{T}_2^{\xi_{2j}})$) is calculated using $tk_{SP}[j] = (\xi_{1j}, \xi_{2j}, \chi_j)$. In this case, updated anonymous ID information ($A_i = \tilde{T}_3 \cdot (\tilde{T}_1^{-\chi_j \xi_{1j}} \tilde{T}_2^{-\chi_j \xi_{2j}})$) can also be decoded using three types of parameters contained in the group signature, that is, $\tilde{T}_1 \leftarrow u_j^\alpha$, $\tilde{T}_2 \leftarrow v_j^\beta$, and $\tilde{T}_3 \leftarrow A_i h_j^{\alpha+\beta}$ and the trace key($tk_{SP}[j] = (\xi_{1j}, \xi_{2j}, \chi_j)$).

Further, the anonymous authentication server 110 and the anonymous ID verification server 130 identify a user corresponding to the anonymous ID in cooperation with each other (if necessary, a service user having identification information, and the group member key corresponding to the anonymous ID is searched for in the user list (User-List) of the anonymous authentication server 110 by making a comparison).

Figure 8:
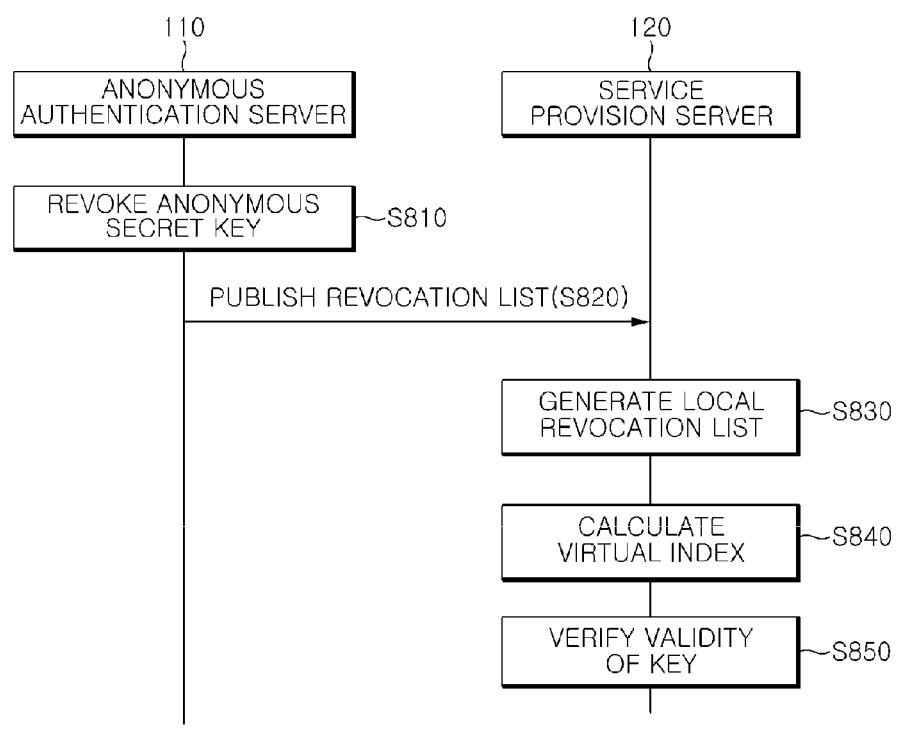
FIG. 8 is a flowchart showing a method of verifying key validity according to an embodiment of the present invention.

In the local link procedure at step S250, the service provision server 120 operates as shown in FIG. 8, and then ensures linkability within the same service domain.

At step S251, the service provision server 120 acquires the group public key, the LL public key, its own LL secret key (LLsk$_{SP}$[j]=(M$_j$, U$_j$, V$_j$)), the message M, and the group signature ($\sigma$=($\tilde{T}_1$, $\tilde{T}_2$, $\tilde{T}_3$, $\tilde{T}_4$, $\tilde{c}$, $\tilde{s}_\alpha$, $\tilde{s}_\beta$,$\tilde{s}_{x_i}$, $\tilde{s}_{y_i}$, $\tilde{s}_{z_i}$$\tilde{s}_{\delta_1}$, $\tilde{s}_{\delta_2}$)) corresponding to the message, and thereafter determines based on a group signature verification algorithm whether the group signature is proper for its own LL public key. If it is determined that the group signature is proper, the service provision server 120 calculates the virtual index of the service user 100 using its own LL secret key using the following Equation 5:

$$P_{ij} \leftarrow e(\tilde{T}_4, M_j) \cdot e(\tilde{T}_1, U_j)^{-1} \cdot e(\tilde{T}_2, V_j) \quad (5)$$

e( ): cryptographic bilinear pairing map
M$_j$, U$_j$, V$_j$: LL Secret Key

At step S252, the service provision server 120 acquires P←e($\tilde{T}_4$, M$_j$)·e($\tilde{T}_1$, U$_j$)$^{-1}$·e($\tilde{T}_2$, V$_j$)=e(B$_i$, M$_j$)=e(g$_0^{-z_i}$, M$_j$) as a virtual index, registers the virtual index in an anonymous token list (AT-List), and then ensures local linkability.

As described above, according to the local link procedure S250 of the present invention, the service provision server 120 cannot calculate A$_i$ (or x$_i$, z$_i$ or B$_i$=g$_0^{-z_i}$) corresponding to the anonymous ID of the anonymous user, but can calculate the virtual index (P$_{ij}$=e(B$_i$, M$_j$)=e(g$_0^{-z_i}$, M$_j$)) having the fixed value.

Then, the service provision server 120 can classify service users using virtual indices that have fixed values for respective service users, and can perform functions such as a mileage service, the assignment of black marks, and the analysis of service usage records using the virtual indices.

That is, the service provision server 120 can support linkability within the same service domain while maintaining anonymity.

However, although service providers j and k cooperate with each other, they cannot calculate the same virtual index from the group signatures of the same user, thus making it impossible to determine whether corresponding users are the same user.

That is, since the service providers j and k can calculate only P$_{ij}$=e(B$_i$, M$_j$)=e(g$_0^{-z_i}$, M$_j$) and P$_{ik}$=e(B$_i$, M$_k$)=e(g$_0^{-z_i}$, M$_k$) from the individual group signatures received from the same user, they cannot acquire the virtual index having the same value. Further, the service provider k cannot calculate a unique virtual index from the group signatures of the same service user which the service provider j received (or vice versa).

Therefore, since the anonymous authentication service method can ensure linkability only in the same service domain and cannot support linking between different service domains, a local linkability function can be satisfied.

Next, a method of verifying key validity in an anonymous authentication service for providing local linkability will be described in detail with reference to FIG. 8.

FIG. 8 is a flowchart showing a method of verifying key validity according to an embodiment of the present invention.

The present invention adds H$_j$(where H$_j$=M$_j^{x_j^{-1}}$) to the LL secret key (LLsk$_{SP}$[j]=(M$_j$, U$_j$, V$_j$)), which is provided by the anonymous ID verification server 130 to the service provision server 120 at the service provider join step S212. Therefore, in the key validity verification method according to the embodiment of the present invention, the LL secret key is implemented as "LLsk$_{SP}$[j]=(M$_j$, U$_j$, U$_j$, V$_j$)".

When the LL secret key is implemented in this way, the service provision server 120 can generate two unique indices for linking in the group signature verification procedure at step S230. In the prior art, only the virtual index P$_{ij}$=e(B$_i$, M$_j$)=e(g$_0^{-z_i}$, M$_j$) can be generated, but, in the present invention, P2$_{ij}$=e(T$_3$, H$_j$)·e(T$_1$, U$_j$)$^{-1}$·e(T$_2$, V$_j$)$^{-1}$=e(A$_i$, H$_j$) can be generated as a new virtual index. In this case, when the key of a relevant user in a given group is revoked, a virtual index for the relevant user whose key has been revoked is generated and is then used for comparison.

As shown in FIG. 8, the key validity verification method is performed by the anonymous authentication server 110 and the service provision server 120.

At step S810, the anonymous authentication server 110 revokes an anonymous secret key currently in its possession for a specific reason. Here, the specific reason may include the user's request for the revocation of a key, the expiration of the validity term, the exposure of the key, etc.

A set of keys of the users that are revoked due to the revocation of the anonymous secret key is given as {gsk'[k]= (A'$_k$, x'$_k$, z'$_k$, y'$_k$|k=1, . . . r}.

At step S820, the anonymous authentication server 110 generates a Revocation List (RL) and publishes the revocation list. Here, the revocation list is represented by the following Equation 6:

$$RL=\{(A'_k)|k=1\ldots r\} \quad (6)$$

At step S830, the service provision server 120 generates a Local Revocation List (LRL) using the RL and its own LL secret key. Here, the LRL is represented by the following Equation 7:

$$LRL[j]=\{e(A'_k, H_j)|k=1\ldots r\} \quad (7)$$

e( ): cryptographic bilinear pairing map

The local revocation list does not influence the procedure for requesting and verifying a group signature in the anonymous authentication service method because the service provision server 120 can periodically access the anonymous authentication server 110 and perform calculations in advance.

At step S840, the service provision server 120 calculates the virtual index of the service user 100 when the service user 100 creates a signature. Here, the virtual index according to an embodiment of the present invention is represented by the following Equation 8:

$$P2_{ij}=e(A_i, H_j) \quad (8)$$

e( ): cryptographic bilinear pairing map

At step S850, the service provision server 120 verifies whether the key of the service user 100 is valid, on the basis of whether the virtual index is included in the local revocation list.

In the prior art, the computation time required in the key update scheme or the VLR scheme was needed to verify key validity. In contrast, the present invention additionally calculates a virtual index at the time of verifying a signature, and compares the virtual index with the local revocation list, thus efficiently inspecting key validity.

Figure 9:
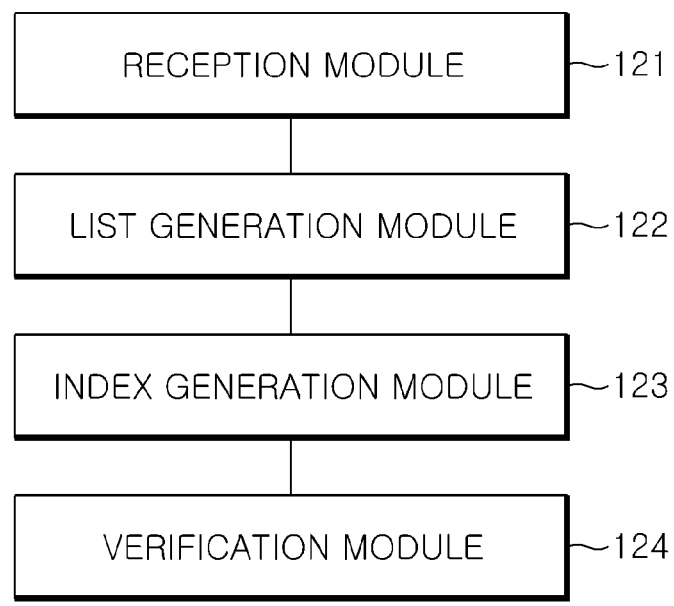
FIG. 9 is a block diagram showing a server for performing the key validity verification method according to an embodiment of the present invention.

FIG. 9 is a block diagram showing a server for performing the key validity verification method according to an embodiment of the present invention.

As shown in FIG. 9, a service provision server 120 includes a reception module 121, a list generation module 122, an index generation module 123, and a verification module 124.

The reception module 121 receives a revocation list from an anonymous authentication server 110.

The list generation module 122 generates a local revocation list (LRL) using the revocation list and its own LL secret key. Here, the local revocation list is represented by the above Equation 7.

When a service user 100 creates a signature, the index generation module 123 calculates the virtual index of the service user 100, as given by the above Equation 8.

The verification module 124 verifies whether the key of the service user 100 is valid, on the basis of whether the virtual index is included in the local revocation list.

Next, an example of the verification of key validity will be described in detail with reference to FIG. 10.

FIG. 10 is a diagram illustrating an example of the verification of key validity according to an embodiment of the present invention.

As shown in FIG. 10, after a key "usk[1]=$(A_1, x_1, y_1, z_1)$" is revoked from group 1, a service user 1 100_1 creates a new key "usk[1]'=$(A'_1, x'_1, y'_1, z_1)$" in group 3.

After a key "usk[2]=$(A_2, x_2, y_2, z_2)$" is revoked from group 1, a service user 2 100_2 additionally undergoes a procedure for generating a key in group 4 and revoking the key from group 4 twice (that is, usk[2]'=$(A'_2, x'_2, y'_2, z_2)$ and usk[2]''=$(A''_2, x''_2, y''_2, z_2)$).

After a key (usk[3]=$(A_3, x_3, y_3, z_3)$) is revoked from the group 1, a service user 3 100_3 generates a new key (usk[3]'=$(A'_3, x'_3, y'_3, z_3)$) in group 4.

That is, a revocation list for the group 1 is "$RL_1=(A_1, A_2, A_3)$", and the revocation list for the group 4 is "$RL_4=(A'_2, A''_2)$".

The service provision server 120 generates its own local revocation list using the revocation list for group 4. Such a local revocation list is changed, as given by the following Equation 9:

$$LRL_4 = \{e(A'_2, H_j)\} \rightarrow \{e(A'_2, H_j), e(A''_2, H_j)\} \quad (9)$$

e( ): cryptographic bilinear pairing map

In this situation, it is assumed that the service user 3 100_3 generates a group signature and requests the service provision server 120 to authenticate the group signature.

In this case, the service user 3 100_3 generates a signature using its own secret key (usk[3]'=$(A'_3, x'_3, y'_3, z_3)$), a group public key (gpk$_4$=$(g_0, g''_1, g''_2, g''_3, g''_4, w'')$), and the LL public key (LLpk$_{SP}$=$(u_j=m_j^{\xi_1}, v_j=m_j^{\xi_2}, h_j, m_j)$) of the service provision server 120.

The service provision server 120 generates a virtual index 2 based on the signature, wherein the virtual index 2 is represented by the following Equation 10:

$$P2_{3j} = e(A_3, H_j) \leftarrow e(T_3, H_j) \cdot e(T_1, U_j)^{-1} e(T_2, V_j)^{-1} \quad (10)$$

e( ): cryptographic bilinear pairing map

The service provision server 120 can verify whether the key of the service user 3 100_3 has been revoked by determining whether the virtual index 2 is included in the local revocation list $LRL_4$ given in Equation 9. In this case, since the virtual index 2 is not present in the local revocation list, it can be proved that authentication has been requested using a valid key that has not been revoked.

For example, when the service user 2 100_2 requests authentication from the service provision server 120 using its own secret key (usk[2]''=$(A''_2, x''_2, y''_2, z_2)$), the service provision server 120 calculates the virtual index 2 ($P2_{2j}=e(A''_2, H_j)$).

The service provision server 120 can be aware of the fact that the virtual index 2 is included in the local revocation list $LRL_4$, and can immediately appreciate that authentication has been requested using the revoked key.

After verifying whether the key used to request authentication has been revoked, the service provision server 120 can recalculate the virtual index ($P_{ij}=e(B_i, M_j)=e(g_0^{-z_i}, M_j)$), as in the case of the anonymous service method that provides local linkability, thus managing members.

The reason for managing members using the conventional virtual indices in this way is that although a procedure, such as update after the revocation of a key, is performed on a service user in a specific service domain, the conventional virtual index ($P_{ij}=e(B_i, M_j)=e(g_0^{-z_i}, M_j)$) continuously outputs a unique value regardless of such a procedure.

In contrast, since the value of the virtual index ($P2_{ij}=e(A_i, H_j)$) required to verify key validity in the key validity verification method according to the embodiment of the present invention continuously changes, only information about a change in the key and about whether the key has been revoked can be verified. Generally, anonymous authentication schemes for providing local linkability can generate a virtual index, and efficiency verify key validity in such a way as to generate a local revocation list using a revocation list and to compare the virtual index with the local revocation list. Furthermore, the scheme for generating a revocation list and a local revocation list can be very easily implemented by applying the present invention.

According to embodiments of the present invention, the key validity verification method is advantageous in that the computation time required to verify key validity can be reduced when service users or service providers individually create signatures or verify the signatures while providing various types of services based on anonymous authentication.

As described above, optimal embodiments of the present invention have been disclosed in the drawings and the present specification. In this case, although specific terms have been used, those terms are merely intended to describe the present invention and are not intended to limit the meanings and the scope of the present invention as disclosed in the accompanying claims.

Therefore, those skilled in the art will appreciate that various modifications and other equivalent embodiments are also possible given the above description. Therefore, the technical scope of the present invention should be defined by the technical spirit of the accompanying claims.

What is claimed is:

1. A method of determining anonymous device authentication in an anonymous service while providing local linkability comprising:
   receiving a key generated by a service user using an anonymous device identification;
   verifying the key;
   calculating a virtual index based on the key;
   receiving a revocation list;
   generating a local revocation list;
   comparing the virtual index to the local revocation list; and
   determining whether the key of the service user is valid, based on whether the virtual index is included in the local revocation list,
   wherein a plurality of authentication transactions in a specific service domain may be identified with the service user, and
   wherein a plurality of authentication transactions between different service domains cannot be identified with the service user.

2. The method of claim 1, wherein the revocation list corresponds to a set of revoked anonymous secret keys generated and published by an anonymous authentication server.

3. The method of claim 1, wherein a service user key is valid when the virtual index is not included in the local revocation list.

4. The method of claim 1, wherein a service user key is invalid when the virtual index is included in the local revocation list.

5. A service provision server for determining anonymous device authentication in an anonymous service while providing local linkability comprising:
   a list generation module for generating a local revocation list;
   an index generation module for generating a virtual index of a service user; and
   a verification module for verifying whether a key of the service user is valid, based on whether the virtual index is included in the local revocation list,
   wherein a plurality of authentication transactions in a specific service domain may be identified with the service user, and
   wherein a plurality of authentication transactions between different service domains cannot be identified with the service user.

6. The service provision server of claim 5, wherein the revocation list corresponds to a set of revoked anonymous secret keys generated and published by an anonymous authentication server.

7. The service provision server of claim 5, wherein a key is valid when the virtual index is not included in the local revocation list and invalid when the virtual index is included in the local revocation list.

* * * * *